United States Patent
Khan et al.

(10) Patent No.: US 10,929,992 B2
(45) Date of Patent: Feb. 23, 2021

(54) METHOD AND SYSTEM FOR RENDERING AUGMENTED REALITY (AR) CONTENT FOR TEXTURELESS OBJECTS

(71) Applicant: Wipro Limited, Bangalore (IN)

(72) Inventors: Ghulam Mohiuddin Khan, Bangalore (IN); Deepanker Singh, Meerut (IN); Jayaprakash Sakthivel, Tirupur (IN)

(73) Assignee: Wipro Limited, Bangalore (IN)

( * ) Notice: Subject to any disclaimer, the term of this patent is extended or adjusted under 35 U.S.C. 154(b) by 53 days.

(21) Appl. No.: 16/370,823

(22) Filed: Mar. 29, 2019

(65) Prior Publication Data

US 2020/0311954 A1 Oct. 1, 2020

(30) Foreign Application Priority Data

Mar. 29, 2019 (IN) .............................. 201941012689

(51) Int. Cl.
*G06T 7/40* (2017.01)
*G06T 15/00* (2011.01)
*G06K 9/62* (2006.01)
*G06K 9/32* (2006.01)

(52) U.S. Cl.
CPC .............. *G06T 7/40* (2013.01); *G06K 9/3233* (2013.01); *G06K 9/6256* (2013.01); *G06T 15/005* (2013.01)

(58) Field of Classification Search
CPC ... G06K 9/3233; G06K 9/6256; G06T 15/005
See application file for complete search history.

(56) References Cited

U.S. PATENT DOCUMENTS

| | | | |
|---|---|---|---|
| 8,698,843 B2 | 4/2014 | Tseng | |
| 9,245,387 B2 | 1/2016 | Poulos et al. | |
| 9,418,292 B2 | 8/2016 | Murphy et al. | |
| 2015/0221098 A1* | 8/2015 | Uemori | G06T 7/254 382/154 |
| 2016/0026253 A1 | 1/2016 | Bradski et al. | |
| 2017/0109935 A1 | 4/2017 | Löffler et al. | |
| 2017/0249776 A1* | 8/2017 | Cao | G06T 7/75 |
| 2019/0018656 A1* | 1/2019 | Monsarrat | G06F 8/60 |

* cited by examiner

*Primary Examiner* — Sam Bhattacharya
(74) *Attorney, Agent, or Firm* — Finnegan, Henderson, Farabow, Garrett & Dunner, LLP (57) ABSTRACT

Methods and content rendering systems for rendering Augmented Reality (AR) content for textureless objects are disclosed. The content rendering system captures one or more image frames associated with objects and transmits to a cloud server to detect one or more textureless objects along with one or more associated buffer Regions of Interest (ROI) based on a pre-trained object detection model. A grid index associated with each buffer ROI defines a position of the one or more textureless objects in each buffer ROI. The content rendering system obtains AR script from the cloud server based on the detected one or more textureless objects. Thereafter, based on the AR script, AR content associated with the one or more textureless objects is rendered in real time at the position of the one or more textureless objects.

18 Claims, 6 Drawing Sheets

METHOD AND SYSTEM FOR RENDERING AUGMENTED REALITY (AR) CONTENT FOR TEXTURELESS OBJECTS

This application claims the benefit of Indian Patent Application Serial No. 201941012689, filed Mar. 29, 2019 which is hereby incorporated by reference in its entirety.

FIELD

The present subject matter is related in general to content rendering and augmented reality-based assistance, more particularly, but not exclusively to a method and system for rendering Augmented Reality (AR) content for textureless objects.

BACKGROUND

With advanced computer technology, Augmented Reality (AR) has gained huge importance. Typically, AR is a technology which combines virtual reality with real world in form of live video imagery that is digitally enhanced with computer-generated graphics. Particularly, in AR systems, a content is rendered on a real-world object of interest for guiding users. The rendered content augments the real-world object to enhance users' current perception of reality.

Generally, there exists three types of AR namely, location-based AR, marker-based AR and marker-less AR. In the location-based AR, augmented contents are rendered based on location of the users. In marker-based AR, a marker such as, a barcode, a QR code and the like is placed on the object of interest for recognition and tracking the same in real time. Whereas in marker-less AR systems, the object of interest is recognized and tracked using image recognition technologies and content is rendered in real time. Currently, image recognition may be performed using feature based or model-based approach. However, the feature-based approach generally fails for a very small and textureless objects. While the model-based approach does not produce good recognition results with varying field of view. This may be further affected in case of devices with minimum processing capabilities as the recognition of the object of interest may be required to be performed on a server and then tracked on the device locally to render the content. Thus, if the object of interest is too small or/and textureless, both recognizing the object using machine learned models and tracking in real time for rendering the content becomes difficult which hinders AR assistance process.

The information disclosed in this background of the disclosure section is only for enhancement of understanding of the general background and should not be taken as an acknowledgement or any form of suggestion that this information forms the prior art already known to a person skilled in the art.

SUMMARY

In an embodiment, the present disclosure may relate to a method for rendering Augmented Reality (AR) content for textureless objects. The method includes capturing one or more image frames associated with objects and transmitting the one or more image frames to a cloud server to detect one or more textureless objects and one or more associated buffer Regions of Interest (ROI) from the one or more image frames based on a pre-trained object detection model. A grid index associated with each buffer ROI defines a position of the one or more textureless objects in each buffer ROI. The method includes obtaining an AR script from the cloud server based on the detected one or more textureless objects and rendering AR content associated with the one or more textureless objects in real time at the position of the one or more textureless objects based on the AR script.

In an embodiment, the present disclosure may relate to a content rendering device or system for rendering Augmented Reality (AR) content for textureless objects. The content rendering system may include a processor and a memory communicatively coupled to the processor, where the memory stores processor executable instructions, which, on execution, may cause the content rendering system to capture one or more image frames associated with objects and transmit the one or more image frames to a cloud server to detect one or more textureless objects and one or more associated buffer Regions of Interest (ROI) from the one or more image frames based on a pre-trained object detection model. A grid index associated with each buffer ROI defines a position of the one or more textureless objects in each buffer ROI. The content rendering system obtains an AR script from the cloud server based on the detected one or more textureless objects and renders AR content associated with the one or more textureless objects in real time at the position of the one or more textureless objects based on the AR script.

In an embodiment, the present disclosure relates to a non-transitory computer readable medium including instructions stored thereon that when processed by at least one processor may cause a content rendering system to capture one or more image frames associated with objects and transmit the one or more image frames to a cloud server to detect one or more textureless objects and one or more associated buffer Regions of Interest (ROI) from the one or more image frames based on a pre-trained object detection model. A grid index associated with each buffer ROI defines a position of the one or more textureless objects in each buffer ROI. The instruction causes the processor to obtain an AR script from the cloud server based on the detected one or more textureless objects and renders AR content associated with the one or more textureless objects in real time at the position of the one or more textureless objects based on the AR script.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3a-FIG. 3c show exemplary representations of rendering Augmented Reality (AR) content for a textureless object in accordance with some embodiments of the present disclosure;

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and a content rendering system for rendering Augmented Reality (AR) content for textureless objects. In an embodiment, AR is a technique which integrates digital visual content into real-world environment. Typically, various model-based approaches are used for recognising an object of interest in real-time. However, such approaches may fail for very small and textureless objects. The present disclosure in such case may utilise buffer region approach and grid-based mechanism, wherein one or more textureless objects may be detected along with associated buffer Regions of Interest (ROI) based on a pre-trained object detection model from a cloud server. In an embodiment, each of the buffer ROI may be associated with a grid index which may indicate a position of the one or more textureless objects in each buffer ROI. Based on the detected one or more textureless objects, an AR script is obtained from the cloud server, such that AR content associated with the one or more textureless objects is rendered in real time at the position of the one or more textureless objects. The present disclosure renders content on the buffer region precisely for enhanced user-experience and visual guidance.

Figure 1:
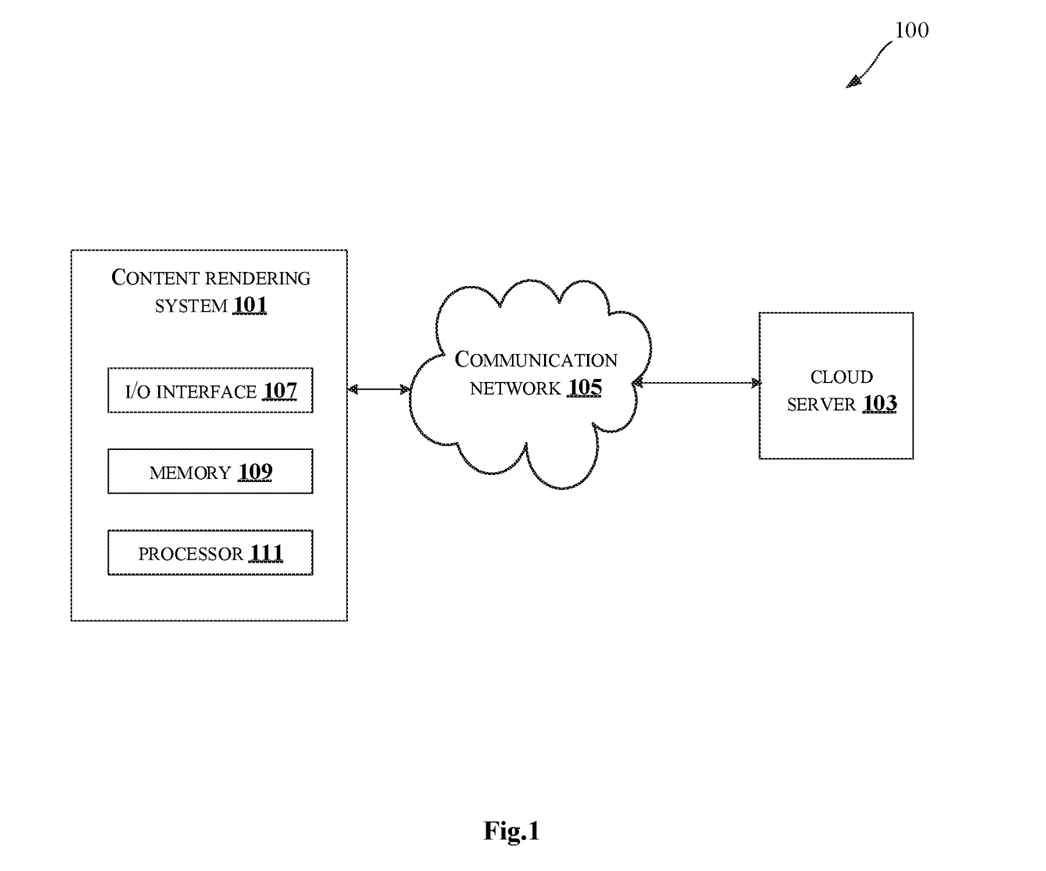
FIG. 1 illustrates an exemplary environment for rendering Augmented Reality (AR) content for textureless objects in accordance with some embodiments of the present disclosure.

FIG. 1 illustrates an exemplary environment for rendering Augmented Reality (AR) content for textureless objects in accordance with some embodiments of the present disclosure.

As shown in FIG. 1, an environment 100 includes a content rendering system 101 connected through a communication network 105 to a cloud server 103. In an embodiment, the cloud server 103 may include object detection models, AR Scripts and AR contents to be rendered for one or more textureless objects. The content rendering system 101 may render Augmented Reality (AR) content for textureless objects onto a digital display (not shown explicitly in FIG. 1). In an embodiment, the content rendering system 101 may exchange data with other components and service providers (not shown explicitly in FIG. 1) using the communication network 105. The communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. In one embodiment, the content rendering system 101 may include, but is not limited to, a laptop, a desktop computer, a Personal Digital Assistant (PDA), a notebook, a smartphone, IOT devices, a tablet, a server, and any other computing devices.

A person skilled in the art would understand that, any other devices, not mentioned explicitly, may also be used as the content rendering system 101 in the present disclosure. Further, the content rendering system 101 may include an I/O interface 107, a memory 109 and a processor 111. The I/O interface 107 may be configured to receive AR script and AR content from the cloud server 103. The AR script and the AR content from the I/O interface 107 may be stored in the memory 109. The memory 109 may be communicatively coupled to the processor 111 of the content rendering system 101. The memory 109 may also store processor instructions which may cause the processor 111 to execute the instructions for rendering Augmented Reality (AR) content for textureless objects.

The content rendering system 101 may train an object detection model using a plurality of training images and corresponding textureless objects. Each of the plurality of training images is annotated with object class labels and buffer Region of Interest (ROI). In an embodiment, the object detection model may be trained based on supervised learning approach.

Further, the content rendering system 101 may generate the AR script for the plurality of textureless objects which may be used for rendering AR content during real time. The content rendering system 101 stores the generated AR scripts along with AR content in the cloud server 103 to be used during runtime.

Considering a real-time situation, when a user requires assistance with textureless objects. In such case, the content rendering system 101 captures one or more image frames associated with objects. In an embodiment, the objects may be any hardware components in real-world environment such as, electronic devices, mechanical devices and the like or any component associated with applications running in a computing system in various domains. In an embodiment, the content rendering system 101 may capture the one or more image frame associated with the objects based on guidance of the user. In another embodiment, the content rendering system 101 may receive the one or more image frames associated with the objects from external devices associated with the user (not shown in FIG. 1 explicitly). The content rendering system 101 may transmit the one or more image frames to the cloud server 103 for detecting one or more textureless objects along with one or more associated buffer ROI. In an embodiment, the one or more textureless objects may refer to objects which may not contain clear distinct features. The one or more textureless objects and the one or more associated buffer ROI may be detected using the pre-trained object detection model. In an embodiment, the buffer ROI may be marked manually during training phase based on knowledge/experience.

In an embodiment, the buffer ROI may be detected automatically by applying predefined offsets across "x and y" dimensions near the one or more textureless objects and validating the detected buffer ROI using the pre-trained object detection model. In an embodiment, each of the one or more buffer ROI may be associated with a grid index which may indicate a position of the one or more textureless objects in each buffer ROI. In an embodiment, the grid index is based on a size of the buffer ROI. Further, the content rendering system 101 may obtain the AR script from the cloud server 103 based on the detected one or more textureless objects. In an embodiment, the AR script includes type of AR content to be rendered for each textureless objects. Thereafter, the content rendering system 101 renders the AR content associated with the one or more textureless objects at the position of the one or more textureless objects.

In an embodiment, the AR content may be retrieved from the cloud server 103 based on the AR script. In an embodiment, the AR content may include, but not limited to, animations, images, graphics, 3D content, audio and video. A person skilled in the art would understand that any other type of AR content, not mentioned explicitly may also be present in the present disclosure. In an embodiment, the content rendering system 101 may track the one or more textureless objects in real time. In an embodiment, based on tracking of the one or more textureless objects, the content rendering system 101 may detect a state of the one or more textureless objects for subsequent actions based on the AR script.

Figure 2:
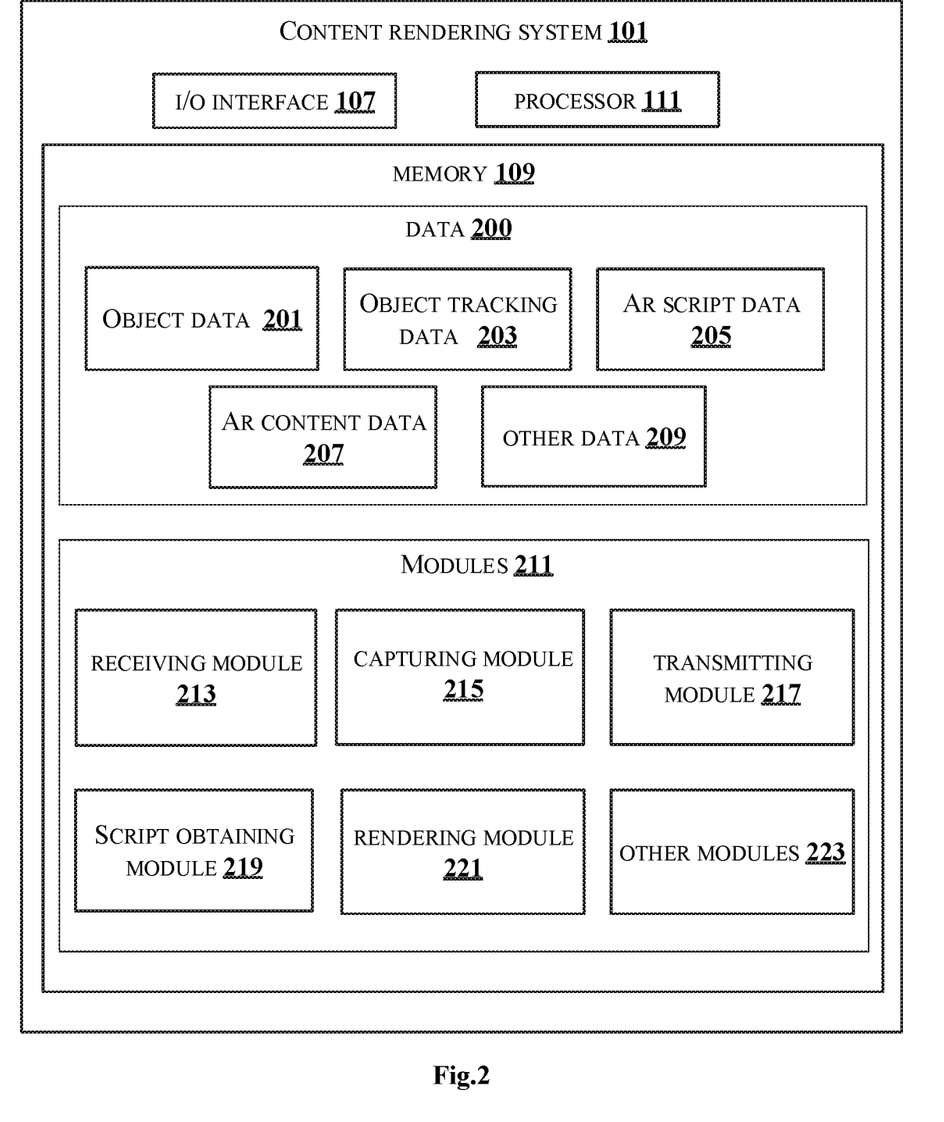
FIG. 2 shows a detailed block diagram of a content rendering system in accordance with some embodiments of the present disclosure.

FIG. 2 shows a detailed block diagram of a content rendering system in accordance with some embodiments of the present disclosure.

The content rendering system 101 may include data 200 and one or more modules 211 which are described herein in detail. In an embodiment, data 200 may be stored within the memory 109. The data 200 may include, for example, object data 201, object tracking data 203, AR script data 205, AR content data 207 and other data 209.

The object data 201 may include the one or more image frames captured for the objects. For instance, the objects may be any real-world object, or any component associated with applications present in computing devices. The object data 201 may include the one or more textureless objects along with associated the one or more buffer ROI detected from the one or more image frames of the objects. Further, the object data 201 may include information regarding the grid index which may indicate the position of the detected one or more textureless objects in the buffer ROI.

The object tracking data 203 may include real-time tracking information associated with the one or more textureless objects. Further, the object tracking data 203 may include the state of the one or more textureless objects based on the tracking.

The AR script data 205 may include information regarding the type of AR contents to be rendered for each of the one or more textureless objects. In an embodiment, the AR script may define AR content rendering procedure for each of the one or more textureless objects.

The AR content data 207 may include the one or more AR content to be rendered for the one or more textureless objects. In an embodiment, the AR content may be for example, animations, images, graphics, 3D content, audio and video. A person skilled in the art would understand that any other type of content which may be rendered during AR, not mentioned explicitly, may also be used in the present disclosure.

The other data 209 may store data, including temporary data and temporary files, generated by modules 211 for performing the various functions of the content rendering system 101.

In an embodiment, the data 200 in the memory 109 are processed by the one or more modules 211 present within the memory 109 of the content rendering system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 111 for performing one or more functions of the content rendering system 101. The said modules 211 when configured with the functionality defined in the present disclosure will result in a novel hardware.

In one implementation, the one or more modules 211 may include, but are not limited to a receiving module 213, a capturing module 215, a transmitting module 217, a script obtaining module 219 and a rendering module 221. The one or more modules 211 may also include other modules 223 to perform various miscellaneous functionalities of the content rendering system 101. In an embodiment, the other modules 223 may include a training module and a tracking module. The training module may train the object detection model using the plurality of training images and corresponding textureless objects. In an embodiment, the plurality of training images may be stored in a training database. In an embodiment, the training images may include frames from videos captured from various view angles, orientations, lighting conditions and the like. The plurality of training images may be captured by different devices to cover resolution variations along with scale, orientations and lighting conditions.

Further, the training images may be annotated/marked based on manuals or technical documents. Particularly, the training images may be annotated by labelling object class and one or more associated buffer ROI. The annotated training images along with the training images may be used to train the object detection model. In an embodiment, the one or more buffer ROI may be decided/marked manually based on knowledge/experience or may be learnt automatically by applying a predefined offsets across x and y dimensions near the one or more textureless objects. In an embodiment, an optimal buffer ROI may be selected for each textureless object associated with the training images using a trained ROI machine learning model. Particularly, the optimal buffer ROI may be selected automatically by providing the one or more buffer ROI with varying offsets around the one or more textureless objects of the training images to the ROI machine learning model. The ROI machine learning model is trained with the one or more buffer ROI associated with the training images. The ROI machine learning model may select and provide the optimal buffer ROI from the one or more buffer ROI associated with the training images.

Further, the training database may include the AR script generated for each of the textureless objects associated with the training images. In an embodiment, the AR script may be generated from existing manuals or from a Subject Matter Expert (SME). In an embodiment, the AR script may indicate a step-by-step procedure which may include details regarding the one or more textureless objects and related annotated training images, such as the type of AR content to be rendered for each textureless object and a grid matrix and grid index information associated with each optimal buffer ROI. Particularly, each of the selected optimal buffer ROI may be divided into one or more grids based on size of corresponding textureless object. Further, the grid index for each of the selected buffer ROI may be selected based on position of the corresponding textureless object with respect to the grid in overall size of corresponding buffer ROI. In an embodiment, the size of the grid in each of the one or more buffer ROI may be identified either manually or automatically based on overall size of the one or more buffer ROI and the position of the corresponding textureless object where the AR content is to be rendered.

The tracking module may track the detected one or more textureless object in real-time. Further, based on the real-time tracking, the tracking module may detect the state of the textureless objects for subsequent actions.

The receiving module 213 may receive the position of the one or more textureless objects in each buffer ROI based on the grid index. The receiving module 213 may receive the AR script for the detected one or more textureless objects. Further, the receiving module 213 may receive the AR content associated with the one or more textureless objects from the cloud server 103 based on the AR script.

The capturing module 215 may capture the one or more image frames associated with the objects. For instance, an object may be a real-world object such as any component of a devices, for example, icons, buttons on a washing machine, telephone and the like or any components present in the computer application running in the content rendering system 101.

The transmitting module 217 may transmit the one or more image frames associated with the objects to the cloud server 103 for detecting the one or more textureless objects along with the one or more associated buffer ROI. The one or more textureless objects and the one or more associated buffer ROI is detected using the pre-trained object detection model. In an embodiment, a predefined set of varying offsets both in "x and y" directions may be used to generate the one or more buffer ROI. The generated one or more buffer ROI may be compared across the one or more image frames based on a sliding window approach to identify matching similar regions. Further, each of the one or more buffer ROI may be associated with the one or more textureless objects which may in turn be associated with respective grid indexes. Particularly, the one or more buffer ROI may be divided into the predefined grid matrix and each grid in the grid matrix may be associated with respective grid index. The grid index may indicate the position of the one or more textureless objects in each buffer ROI.

The script obtaining module 219 may obtain the AR script from the cloud server 103 for the detected one or more textureless objects. In an embodiment, the AR script may include the type of AR content to be rendered for each textureless objects.

The rendering module 221 may render the AR content associated with the one or more textureless objects at the position of the one or more textureless objects. In an embodiment, the AR content for each of the one or more textureless objects may be identified along with associated one or more buffer ROI based on corresponding AR script. Particularly, the rendering module 221 may divide the one or more buffer ROI associated with the one or more textureless objects into the predefined grid matrix based on the AR script. Further, the rendering module 221 may utilise the grid index as stored in the AR script corresponding to the one or more textureless objects to locate the position of the one or more textureless objects for rendering the corresponding AR content in real time. In an embodiment, the AR content may include animations, images, graphics, 3D content, audio and video.

Figure 3A:
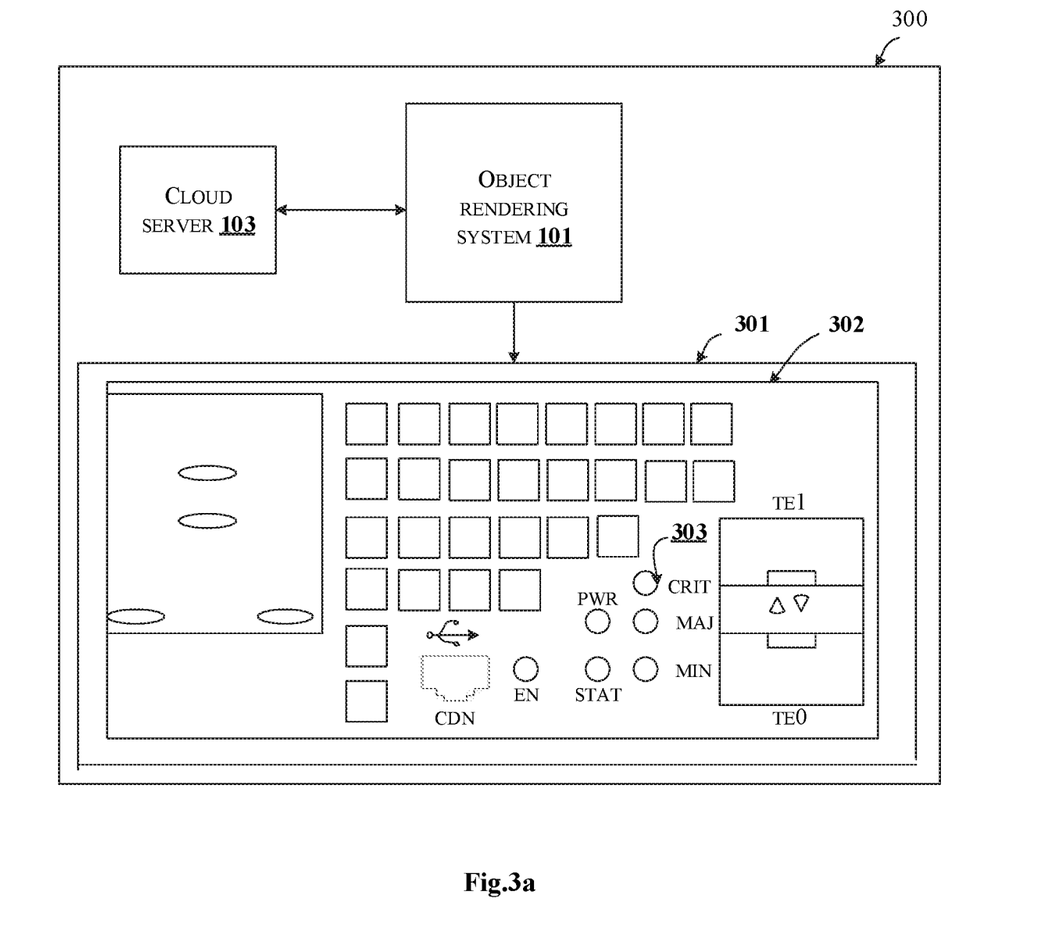
Figure 3B:
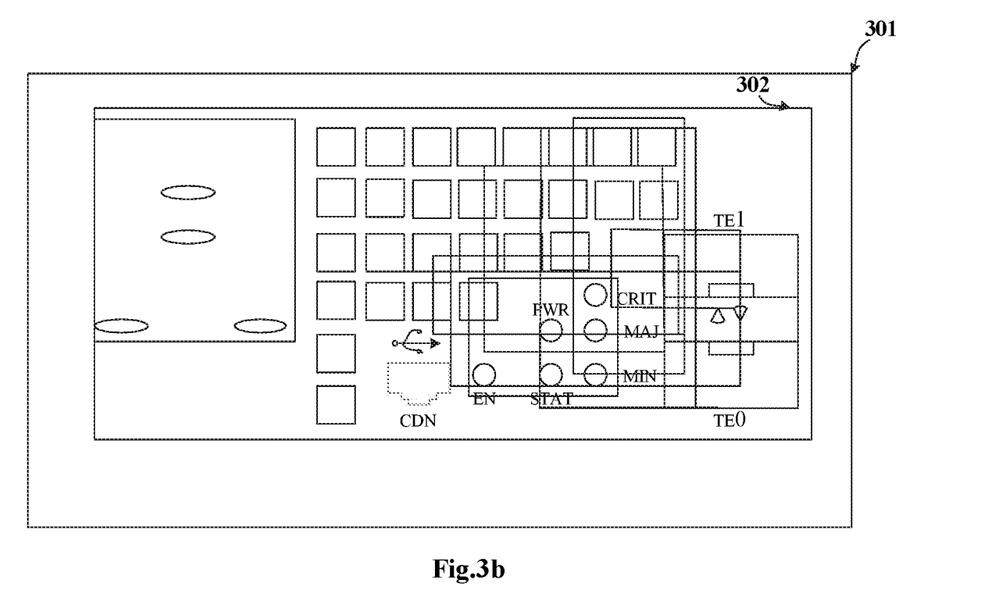
Figure 3C:
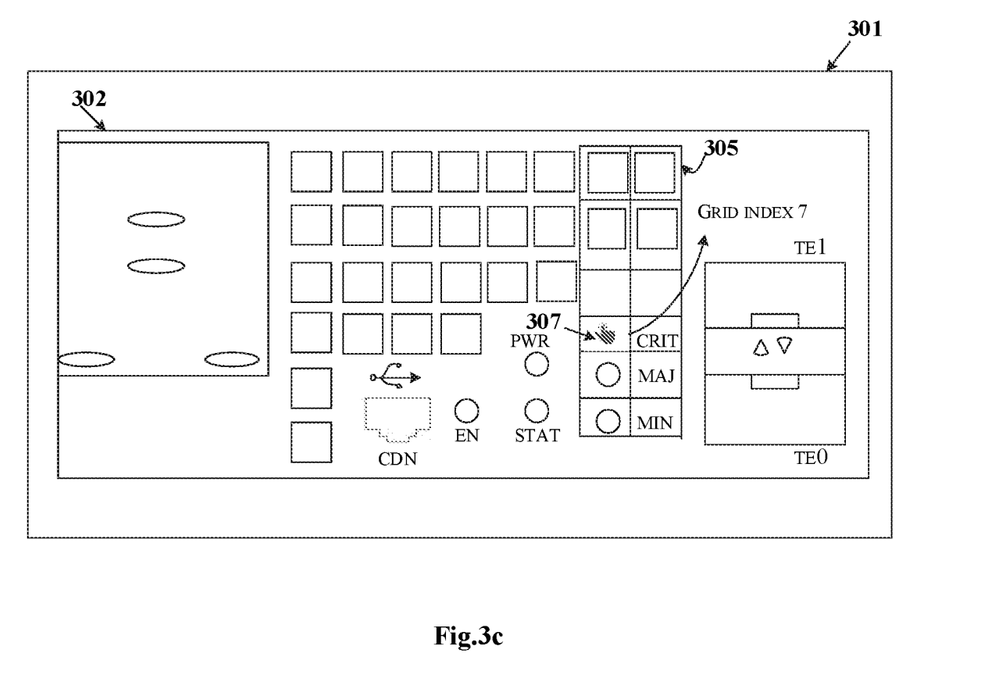

FIG. 3a-FIG. 3c show exemplary representations of rendering Augmented Reality (AR) content for a textureless object in accordance with some embodiments of the present disclosure.

Referring now to FIG. 3a, an exemplary representation 300 for rendering AR content while providing AR based assistance to a user is illustrated. The exemplary representation 300 includes the content rendering system 101 connected with the cloud server 103. Consider, a user requires AR based assistance regarding working of a routing device 302. In such case, the content rendering system 101 may capture one or more objects associated with an image 301 of the routing device 302 as shown in FIG. 3a. The one or more objects may include one or more textureless objects. As indicated in FIG. 3a, consider, the user requires assistance with a textureless object, a CRIT button 303 in the routing device 302. To handle such scenario, the image 301 of the routing device 302 is transmitted to the cloud server 103 for detecting one or more textureless objects. In the present case, the image 301 is transmitted to the cloud server 103 for detecting the CRIT button 303. Further, along with the textureless object, the one or more associated buffer ROI may be detected. In an embodiment, the CRIT button 303 and associated buffer ROI may be identified based on the pre-trained object detection model. In an embodiment, the predefined set of varying offsets both in "x and y" directions of the CRIT button 303 may be used to generate the one or more buffer ROI as shown in FIG. 3b.

In an embodiment, the generated one or more buffer ROI may be compared across the image 301 of the routing device 302 based on the sliding window approach to identify matching similar regions in the image 301 of the routing device 302. In an embodiment, an ROI from the one or more buffer ROI may be selected automatically by providing the one or more buffer ROI with varying offsets around the CRIT button 303. Further, each of the buffer ROI may be associated with the grid index which may indicate the position of the one or more textureless object. Particularly, the one or more buffer ROI associated with the one or more textureless objects may be divided into associated grid matrix based on the AR script obtained for the one or more textureless object. In the present scenario, a buffer ROI 305 (as shown in FIG. 3c) associated with the CRIT button 303 is divided into a predefined grid matrix of six rows and three columns based on the corresponding AR script as shown in FIG. 3c.

Further, the grid index in which the CRIT button 303 is present is seven which may be predefined and stored in the AR script. Thereafter, based on the AR script associated with the CRIT button 303, the content rendering system 101 may in real time render a hand graphic 307 in the grid index seven, which indicates a hand gesture of pressing the CRIT button 303 for assisting the user with the routing device 302.

Figure 4:
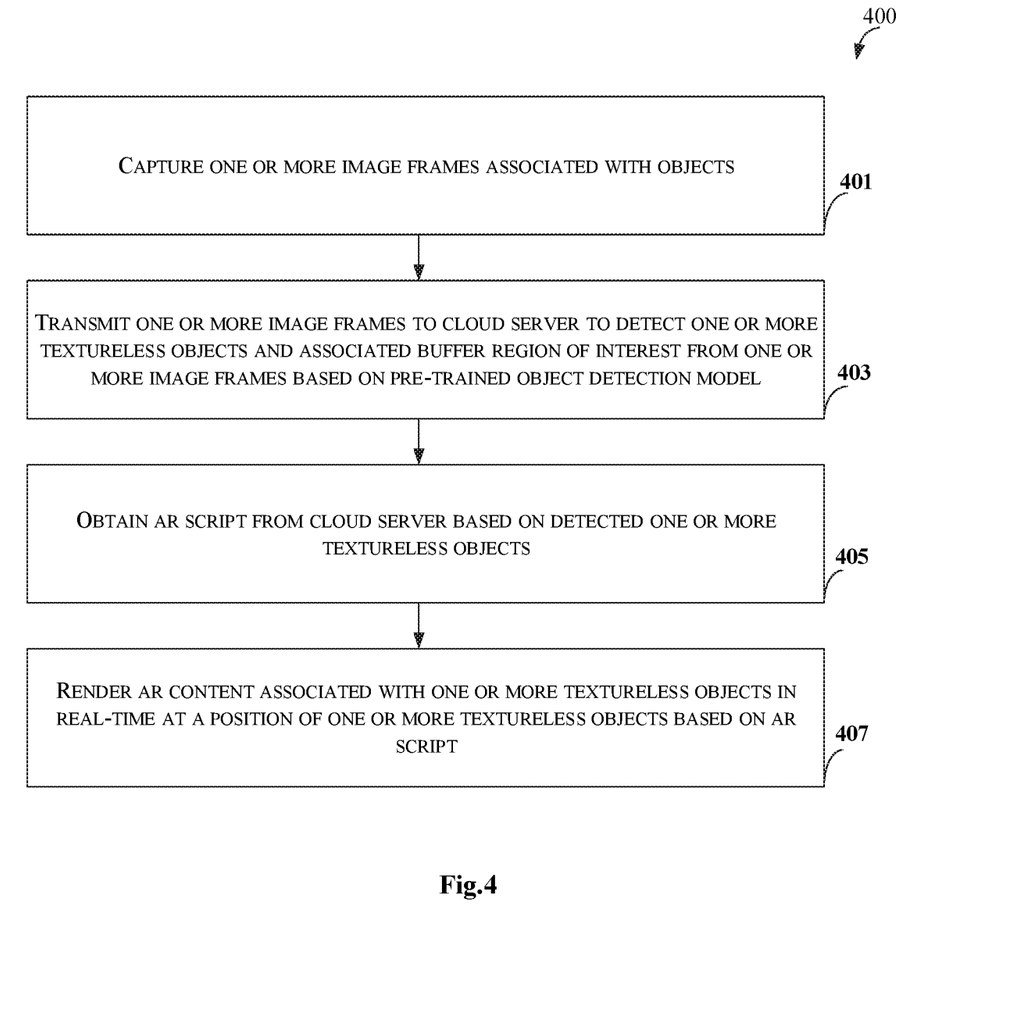
FIG. 4 illustrates a flowchart showing a method for rendering Augmented Reality (AR) content for textureless objects in accordance with some embodiments of present disclosure.

FIG. 4 illustrates a flowchart showing a method for rendering Augmented Reality (AR) content for textureless objects in accordance with some embodiments of present disclosure.

As illustrated in FIG. 4, the method 400 includes one or more blocks for rendering Augmented Reality (AR) content for textureless objects. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the one or more image frames associated with objects are captured by the capturing module 215.

At block 403, the one or more image frames may be transmitted to the cloud server 103 by the transmitting module 217 to detect the one or more textureless objects and the one or more associated buffer Regions of Interest (ROI) from the one or more image frames based on a pre-trained object detection model. In an embodiment, the grid index associated with each buffer ROI defines the position of the one or more textureless objects in each buffer ROI. In an embodiment, the object detection model may be trained using the plurality of training images and corresponding textureless objects. The plurality of training images may be annotated with the object class labels and the one or more associated buffer ROI. In an embodiment, the associated one or more buffer ROI may be decided/marked manually based on knowledge/experience or may be learnt automatically by applying a predefined offsets across x and y dimensions near the one or more textureless objects. In an embodiment, the optimal buffer ROI may be selected for each textureless object associated with the training images using the trained ROI machine learning model.

At block 405, the AR script is obtained by the script obtaining module 219 from the cloud server 103 based on the detected one or more textureless objects. In an embodiment, the AR script may be generated during training phase for each of the textureless objects associated with the training images. In an embodiment, the AR script may be generated from existing manuals or from the Subject Matter Expert (SME). In an embodiment, the AR script may indicate the step-by-step procedure which may include details regarding the one or more textureless objects and related annotated training images, the type of AR content to be rendered for each textureless object and grid matric and grid index information associated with each optimal buffer ROI. In an embodiment, each of the selected optimal buffer ROI may be divided during training phase into the grid based on size of corresponding textureless object. Further, the grid index for each of the selected buffer ROI may be selected based on position of the corresponding textureless object with respect to the grid in overall size of corresponding buffer ROI. In an embodiment, the size of the grid in each of the one or more buffer ROI may be identified either manually or automatically based on overall size of the one or more buffer ROI and the position of the corresponding textureless object where the AR content is to be rendered.

At block 407, the AR content associated with the one or more textureless objects may be rendered by the rendering module 221 in real time at the position of the one or more textureless objects based on the AR script. Particularly, the one or more buffer ROI associated with the one or more textureless objects may be divided into the predetermined grid based on the AR script. Thus, the grid index for each of the selected buffer ROI corresponding to the one or more textureless objects is obtained from the AR script to locate the position of the one or more textureless objects for rendering the corresponding AR content in real time.

Figure 5:
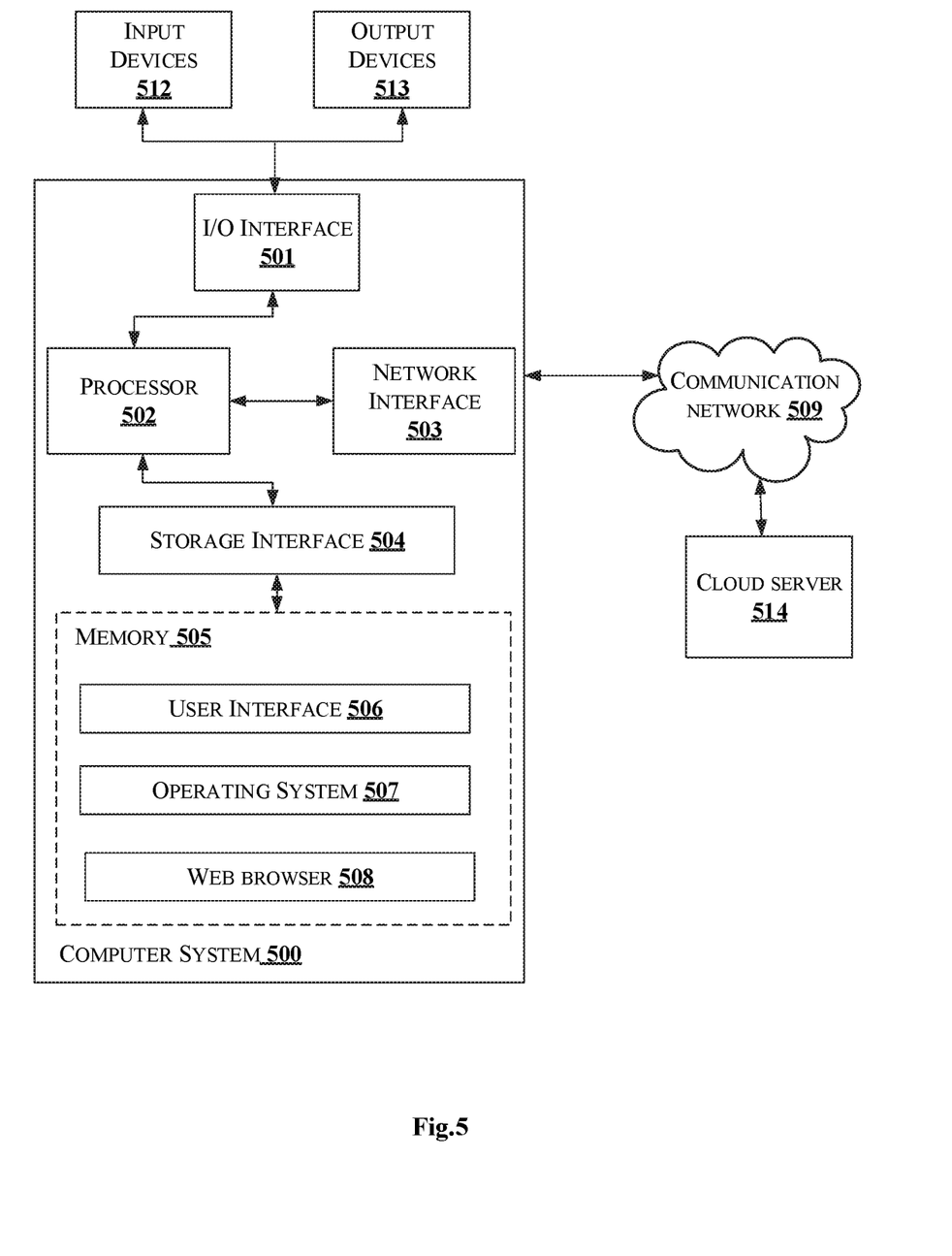
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the content rendering system 101. The computer system 500 may include a central processing unit ("CPU" or "processor") 502. The processor 502 may include at least one data processor for rendering Augmented Reality (AR) content for textureless objects. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the content rendering system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a cloud server 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure renders content on the buffer region precisely, thereby enhancing user-experience and visual guidance.

An embodiment of the present disclosure facilitates in guidance in AR systems on low end devices by rendering content precisely even on textureless objects.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of rendering Augmented Reality (AR) content for textureless objects, the method comprising:
    capturing, by a content rendering system, one or more image frames associated with one or more objects;
    transmitting, by the content rendering system, the one or more image frames to a cloud server to detect one or more textureless objects and one or more associated buffer Regions of Interest (ROI) from the one or more image frames based on a pre-trained object detection model, wherein a grid index associated with each buffer ROI defines a position of the one or more textureless objects in each buffer ROI, wherein the pre-trained object detection model is trained using a plurality of training images and corresponding textureless objects;
    obtaining, by the content rendering system, an AR script from the cloud server based on the detected one or more textureless objects;
    dividing, by the content rendering system, the one or more associated buffer ROI into a predefined grid matrix based on the AR script, wherein each grid in the predefined grid matrix is associated with a respective grid index; and
    rendering, by the content rendering system, AR content associated with the one or more textureless objects in real time at the position of the one or more textureless objects based on the AR script.

2. The method as claimed in claim 1, further comprising tracking, by the content rendering device, the one or more textureless objects in real time.

3. The method as claimed in claim 1, further comprising training, by the content rendering device, the object detection model using a plurality of training images and corresponding textureless objects and the plurality of training images are annotated with object class labels and the one or more associated buffer ROI.

4. The method as claimed in claim 1, wherein the grid index is based on a size of the buffer ROI.

5. The method as claimed in claim 1, wherein the AR script comprises a type of AR content to be rendered for each of the one or more textureless objects and the AR content comprises animations, images, graphics, 3D content, audio and video.

6. The method as claimed in claim 1, further comprising detecting, by the content rendering device, a state of the one or more textureless objects and tracking, by the content rendering device, the position of one or more textureless objects for one or more subsequent actions based on the AR script.

7. A content rendering system for rendering Augmented Reality (AR) content for textureless objects, comprising:
a processor; and
a memory communicatively coupled to the processor, wherein the memory stores processor instructions that, when executed by the processor, cause the processor to:
capture one or more image frames associated with one or more objects;
transmit the one or more image frames to a cloud server to detect one or more textureless objects and one or more associated buffer Regions of Interest (ROI) from the one or more image frames based on a pre-trained object detection model, wherein a grid index associated with each buffer ROI defines a position of the one or more textureless objects in each buffer ROI, wherein the pre-trained object detection model is trained using a plurality of training images and corresponding textureless objects;
obtain an AR script from the cloud server based on the detected one or more textureless objects;
divide the one or more associated buffer ROI into a predefined grid matrix based on the AR script, wherein each grid in the predefined grid matrix is associated with a respective grid index; and
render AR content associated with the one or more textureless objects at the position of the one or more textureless objects based on the AR script.

8. The content rendering system as claimed in claim 7, wherein the programmed instructions, when executed by the processor, further cause the processor to track the one or more textureless objects in real time.

9. The content rendering system as claimed in claim 7, wherein the programmed instructions, when executed by the processor, further cause the processor to train the object detection model using a plurality of training images and corresponding textureless objects and the plurality of training images are annotated with object class labels and the one or more associated buffer ROI.

10. The content rendering system as claimed in claim 7, wherein the grid index is based on a size of the buffer ROI.

11. The content rendering system as claimed in claim 7, wherein the AR script comprises type of AR content to be rendered for each of the one or more textureless objects and the AR content comprises animations, images, graphics, 3D content, audio and video.

12. The content rendering system as claimed in claim 7, wherein the programmed instructions, when executed by the processor, further cause the processor to detect a state of the one or more textureless objects and track the position of one or more textureless objects to render AR content for one or more subsequent actions based on the AR script.

13. A non-transitory computer readable medium having stored thereon instructions for rendering Augmented Reality (AR) content comprising executable code which when executed by one or more processor, causes the one or more processors to:
capturing one or more image frames associated with one or more objects;
transmitting the one or more image frames to a cloud server to detect one or more textureless objects and one or more associated buffer Regions of Interest (ROI) from the one or more image frames based on a pre-trained object detection model, wherein a grid index associated with each buffer ROI defines a position of the one or more textureless objects in each buffer ROI, wherein the pre-trained object detection model is trained using a plurality of training images and corresponding textureless objects;
obtaining an AR script from the cloud server based on the detected one or more textureless objects;
dividing the one or more associated buffer ROI into a predefined grid matrix based on the AR script, wherein each grid in the predefined grid matrix is associated with a respective grid index; and
rendering AR content associated with the one or more textureless objects in real time at the position of the one or more textureless objects based on the AR script.

14. The non-transitory computer-readable medium of claim 13, wherein the executable code, when executed by the processors, further causes the processors to track the one or more textureless objects in real time.

15. The non-transitory computer-readable medium of claim 13, wherein the executable code, when executed by the processors, further causes the processors to train the object detection model using a plurality of training images and corresponding textureless objects and the plurality of training images are annotated with object class labels and the one or more associated buffer ROI.

16. The non-transitory computer-readable medium of claim 13, wherein the grid index is based on a size of the buffer ROI.

17. The non-transitory computer-readable medium of claim 13, wherein the AR script comprises type of AR content to be rendered for each of the one or more textureless objects and the AR content comprises animations, images, graphics, 3D content, audio and video.

18. The non-transitory computer-readable medium of claim 13, wherein the executable code, when executed by the processors, further causes the processors to detect a state of the one or more textureless objects and track the position of one or more textureless objects to render AR content for one or more subsequent actions based on the AR script.

* * * * *